US006370446B1

(12) United States Patent
Divine

(10) Patent No.: US 6,370,446 B1
(45) Date of Patent: Apr. 9, 2002

(54) APPARATUS FOR ASSISTING MANUAL SORTING OF MAIL ARTICLES

(75) Inventor: Marc Divine, Bourg la Reine (FR)

(73) Assignee: Neopost Industrie, Bagneux (FR)

(*) Notice: Subject to any disclaimer, the term of this patent is extended or adjusted under 35 U.S.C. 154(b) by 0 days.

(21) Appl. No.: 09/227,885

(22) Filed: Jan. 11, 1999

(30) Foreign Application Priority Data

Jan. 12, 1998 (FR) ........................................... 98 00188

(51) Int. Cl.[7] ................................................ G06F 7/00

(52) U.S. Cl. ...................... 700/226; 700/223; 700/224; 700/225; 700/227

(58) Field of Search ................................ 700/227, 226, 700/223, 224, 225

(56) References Cited

U.S. PATENT DOCUMENTS

| | | | | |
|---|---|---|---|---|
| 5,008,827 A | * | 4/1991 | Sansone et al. | 364/464.02 |
| 5,031,223 A | * | 7/1991 | Rosenbaum et al. | 382/1 |
| 5,535,127 A | * | 7/1996 | Uno et al. | 364/464.02 |
| 5,558,232 A | * | 9/1996 | Stevens et al. | 209/584 |
| 5,734,568 A | * | 3/1998 | Borgendale et al. | 364/409 |
| 5,794,789 A | * | 8/1998 | Payson et al. | 209/549 |
| 5,803,704 A | * | 9/1998 | Lazzarotti | 414/793.4 |
| 5,990,437 A | * | 11/1999 | Coutant et al. | 209/583 |
| 6,035,291 A | * | 3/2000 | Thiel | 705/408 |
| 6,259,964 B1 | * | 7/2001 | Robinson | 700/224 |

FOREIGN PATENT DOCUMENTS

| | | | |
|---|---|---|---|
| EP | 0 586 883 A2 | 3/1994 | |
| EP | 0755728 A2 * | 1/1997 | B07C/3/20 |
| FR | 2 561 550 A1 | 9/1985 | |

* cited by examiner

*Primary Examiner*—Christopher P. Ellis
*Assistant Examiner*—Michael E. Butler
(74) *Attorney, Agent, or Firm*—Sughrue Mion, PLLC

(57) ABSTRACT

Apparatus for providing assistance in manual sorting of articles of mail performed by one or more operators having at their disposition storage elements or pigeon-holes corresponding to determined destinations, each article of mail containing at least one document. The apparatus has opto-electronic recognition means for identifying on an article of mail or on a document extracted therefrom, at least one item of data suitable for providing direct or indirect information about the destination of said article, comparator means for comparing said identified data item with a plurality of previously stored predetermined data items, allocation means for allocating a unique identity code to said recognized data item corresponding to a determined storage element allocated to a particular destination, and contactless transmission means for transmitting said identity code to all of the storage elements, each of said storage elements being provided with indicator means mounted on removable fixing means and responding selectively to said identity code.

26 Claims, 4 Drawing Sheets

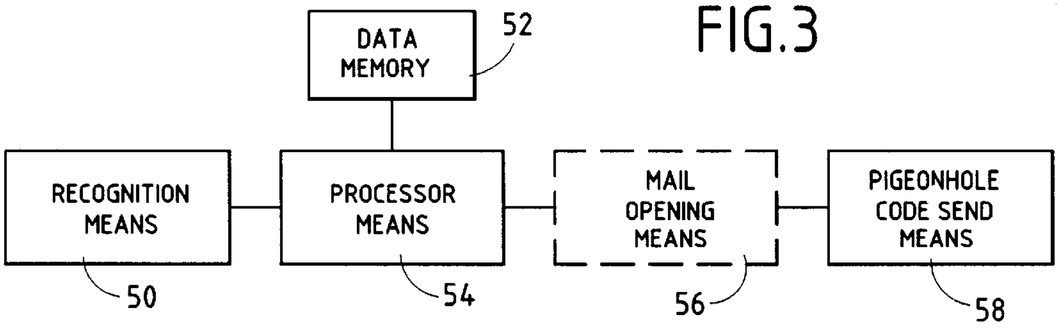
FIG.3
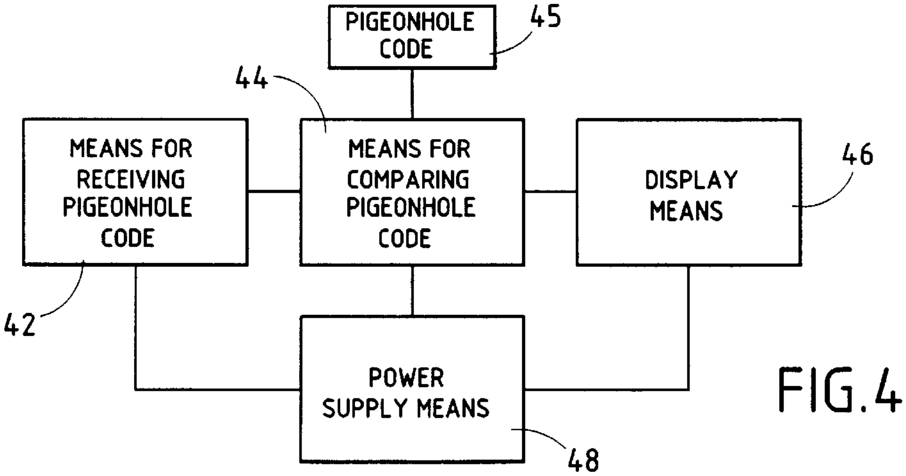
FIG.4
FIG.5
| NAME | SERVICE | PIGEONHOLE N° | CONFID. | RECEIVES MAIL FOR SERVICE |
|---|---|---|---|---|
| BERNARD | Accounts | 001 | | YES |
| CLEMENT | Marketing | 002 | | |
| DENIS | Purchasing | 003 | | |
| DUPONT | CEO | 004 | YES | |
| DURAND | Board | 005 | YES | |
| MARTIN | Purchasing | 006 | | YES |
| ROBERT | Marketing | 007 | | YES |
| SIMON | Accounts | 008 | | |
| ⋮ | ⋮ | ⋮ | | |

APPARATUS FOR ASSISTING MANUAL SORTING OF MAIL ARTICLES

TECHNICAL FIELD

The present invention relates exclusively to the field of processing mail, and it relates more particularly to apparatus for providing assistance in manually sorting articles of mail as performed by an operator in business premises devoted specifically to handling mail.

PRIOR ART

At present, mail is sorted in business or industrial enterprises and in public authorities by a process that is essentially manual. When mail is received by the business, the operator having the task of sorting the mail takes articles of mail one by one, identifies the destination person or service and, possibly after opening the article of mail, places it in a pigeonhole corresponding to said person or service. It is clear that such an entirely manual process is lengthy and suffers from very low productivity. Productivity is particularly low when the number of pigeonholes is large, and when the services of the business are being constantly reorganized, and also depends on whether the people performing the task do it regularly or only on a temporary basis (e.g. during a holiday period when a colleague or a trainee is replacing the usual operator). In similar manner, the same manual sorting method can be used for mail leaving the business on its way to the postal authorities, for the purpose of satisfying the requirements thereof.

American patent U.S. Pat. No. 4,181,948 discloses a system of assisting manual sorting for the purpose of increasing the productivity of this type of task. For this purpose, a unit is proposed that has a determined, but quite small, number of pigeonholes (fifteen to up to eighteen in the example shown), which unit is designed to be placed on a workbench like a piece of office equipment (see FIG. 4 of that patent). The unit is fully prewired with a power supply and a set of indicators allocated to each of its pigeonholes. These indicators are driven from a PC type computer which is connected to the unit via a conventional serial computer link, and they are actuated as a function of data input at the keyboard of the computer by the operator of the sorting service concerned (specifically a company code when sorting air tickets).

Unfortunately, the solution proposed by that American patent still suffers from numerous drawbacks. Firstly, it requires the operator to input certain items of information manually (when sorting mail, that would be the destination of the article of mail); in addition to the loss of productivity that this operation causes, it is also a source of error. Thereafter, it assumes that traditional pigeonholes or any other storage systems presently available in businesses should be replaced by the proposed unit. Finally, it would appear to be difficult to implement for small- and medium-sized enterprises, i.e. for enterprises having no more than about one hundred people (and thus in practice fewer than fifty potential destinations for mail).

OBJECT AND DEFINITION OF THE INVENTION

An object of the present invention is to remedy the above drawbacks by proposing apparatus that enables very significant improvements in productivity to be obtained with manual sorting throughput being multiplied by a factor of at least three, that enables error rate to be significantly reduced, and that above all is adaptable to sorting apparatuses already in use in businesses. Furthermore, the apparatus of the invention must be very easy to operate, being capable of being run by one or more operators, and it must be reasonable in cost. Also, the apparatus should be capable of being adapted simply and easily to the various sorting methods currently employed in businesses.

These objects are achieved by apparatus for providing assistance in manual sorting of articles of mail performed by one or more operators having at their disposition storage elements or pigeonholes corresponding to determined destinations, the articles of mail each including at least one document, and the apparatus comprising:

- optoelectronic recognition means for scanning an article of mail or a document extracted from the article, and identifying thereon at least one data item suitable for giving direct or indirect information about the destination of the article;
- comparator means for comparing said identified data item with a plurality of previously-stored predetermined data items;
- allocation means for allocating a unique identity code to the recognized data item corresponding to a determined storage element allocated to a particular destination; and
- contactless transmission means for transmitting said identity codes to all of the storage elements;
- each of said storage elements being provided with display means mounted on removable fixing means and responding selectively to said identity code.

By this particular structure, the apparatus of the invention can be implemented without difficulty in any mail service in a business or a public authority. It suffices merely to use the removable fixing means to place the indicator means on existing pigeonholes or storage elements, without requiring a technician to provide any kind of cabling and without any need for the elements themselves to be replaced. The apparatus may have a single terminal capable of scanning both mail articles of any format and A4 documents, or it may be organized around a personal computer (PC) provided with a flat scanner for scanning A4 documents, with the terminal serving to scan articles of mail only. In either case, recognition can relate to OCR type characters or to hand-writing.

The invention thus makes it possible to eliminate the presorting step, and possibly also to refine sorting by reducing the number of subsequent steps.

Preferably, the said contactess transmission means include optoelectronic link means, e.g. operating in the infrared, or radio link means.

Advantageously, said indicator means comprise visual or audible indicator means having their own power supplies and in the form of at least one light indicator or display panel for displaying a number for processing a batch of articles of mail. Said display panel is organized so that it is capable of displaying a plurality of numbers in succession, each corresponding to a determined position of an article of mail in the batch being processed.

The power supplies of said indicator means are provided by photocells, inductive elements, or more simply by respective batteries that preferably have long lifetime, e.g. lithium cells. Advantageously, the removable fixing means may comprise clamp or clip type elements.

BRIEF DESCRIPTION OF THE DRAWINGS

Other characteristics and advantages of the present invention appear more clearly from the following description given by way of non-limiting indication and with reference to the accompanying drawings, in which:

FIGS. 3 and 4 are diagrams showing the main elements constituting the FIG. 1 apparatus;

FIG. 5 is a table showing the data required for operating the apparatus of the invention.

DETAILED DESCRIPTION OF A PREFERRED EMBODIMENT

Figure 1:
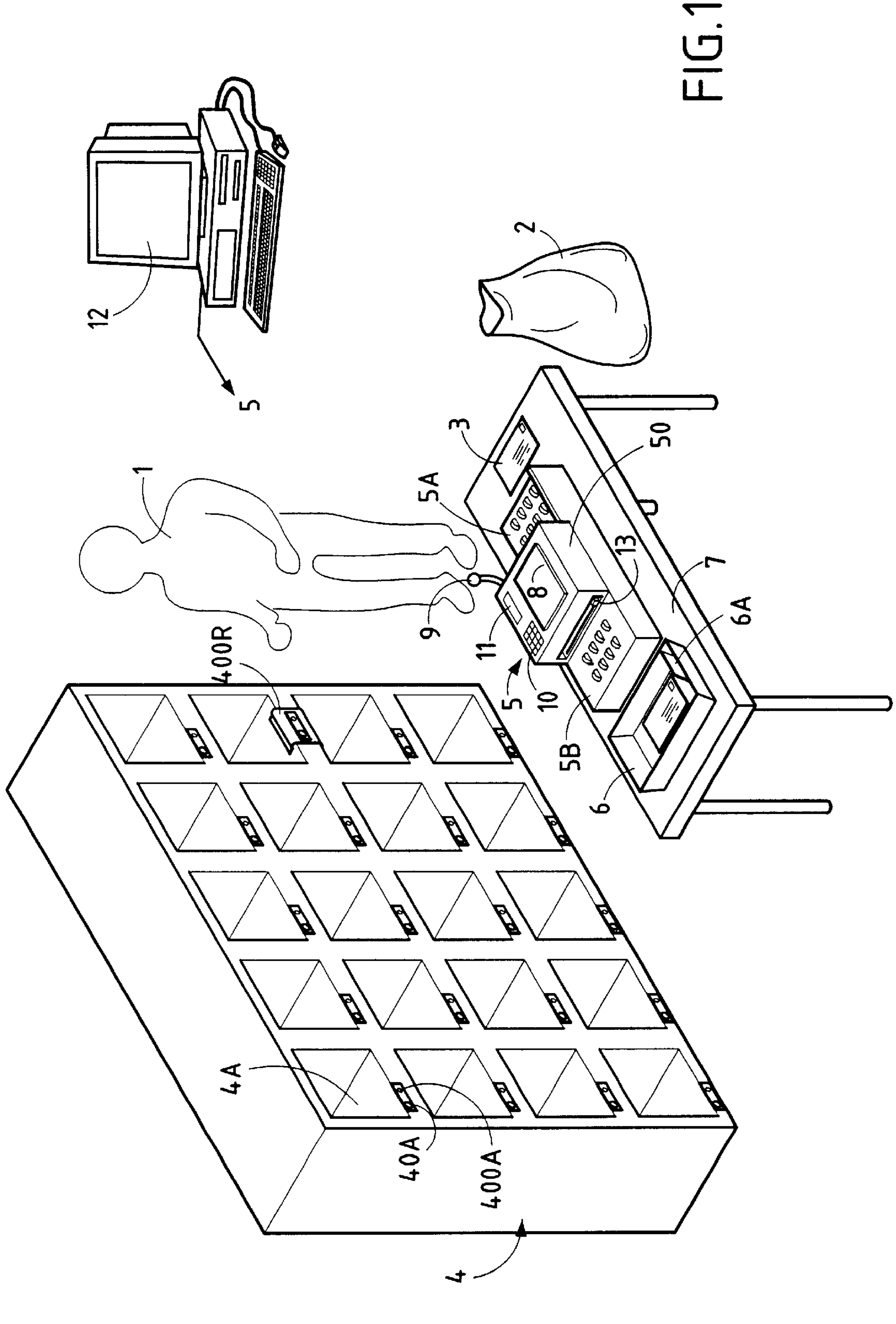
FIG. 1 shows an embodiment of apparatus of the invention for providing assistance in manual sorting.

As shown in FIG. 1, apparatus of the invention for assisting manual sorting is designed to be implemented in the mail services of business or public authorities. Conventionally, in such services, one or more operators 1 take the various articles of mail 3 that need to be sorted from a box or bag of mail 2 that has come from the postal authorities. A first sort can be performed to remove articles that are confidential, strictly personal, urgent, or to be opened immediately for handing to their addressees, after which the operators read one by one the addresses carried on the remaining articles of mail (or possibly on documents taken from said articles) to identify their destinations, and once they have been recognized, the articles of mail (or documents extracted from said document for identification purposes) are placed in pigeonholes (e.g. pigeonhole 4A) in a frame 4 (having only one face in the example shown), where each pigeonhole corresponds to a particular destination.

In accordance with the invention, articles of mail are read by an optical reader terminal 5 comprising document input means 5A, optoelectronic read and recognition means 50, and means 5B for outputting recognized documents. The document input means include an accumulator hopper to enable a stack of mail articles to be processed, preferably articles of various formats, for example formats known in Europe under the references C4 (229 mm×324 mm), C5 (162 mm×299 mm), C6 (114 mm×162 mm), or C6/5 (114 mm×229 mm), and in the USA under the references #13 (254 mm×330 mm), #10 (105 mm×241 mm), #9 (98 mm×225 mm), #6½ (152 mm×229 mm), and check (92 mm×219 mm). The read and recognition means conventionally comprise scanning hardware means and software means. The hardware means are organized to enable said scanning to be performed regardless of the orientation of an article of mail, i.e. regardless of whether the envelope is presented horizontally or vertically, one face up or the other face up. The software means conventionally comprise optical character recognition (OCR) type software (operating on single characters or on whole words). According to a preferred characteristic of the invention, the software also has an additional function enabling it to recognize handwriting.

Recognition can be applied to any predetermined type of data that can give direct or indirect information about the destination which may be a person mentioned by name, or a service or department, or indeed an office within the business or public authority to which the article of mail has been sent. This data, in addition to the destination proper (personal name or service) can relate to other information such as: name of the sender in a zone reserved for this purpose on the article of mail or appearing in the slogan of the post imprint, a serial number or authentication number of a postage meter (when the mail imprint is made by such a machine), or indeed a particular configuration of the mail article (kind of envelope, kind of stamp, character font used, positions of written zones or printed zones in the postal imprint, etc.)

When processing reply envelopes, these can be special preprinted codes carried on the envelopes, and with internal mail, they can be the identity number of an employee. When sorting outgoing mail (i.e. from the business to the postal authorities), the data analyzed can relate to the territory of the destination, to its post code, or indeed to the kind of destination, so as to select an appropriate rate of payment (normal, slow, etc.).

By recognizing the destination of an article of mail from the identified data, it is possible to give the article a unique identity number corresponding to a single pigeonhole in the storage frame 4. According to the invention, each pigeonhole is provided with indicator means (e.g. 40A) mounted on the unit by removable fixing means (e.g. 400A) and capable of being actuated from the optical reader terminal 5. The indicator means may be of the visual type (e.g. one or more light-emitting diodes (LEDs) or liquid crystal display panels) or of the audible type (a buzzer), and the fixing means may have a self-adhesive portion capable of being undone several times (for example a peel-off type portion or a fixing of the type known under the name VELCRO), or they may be constituted merely by clamps or clips, as shown in FIG. 1 under referenced 400R.

The indicator means are of a type that is independently powered, e.g. by means of a lithium battery (this type of cell having a long lifetime, of the order of 3 to 5 years), or preferably by conventional self-contained power supply means such as photocells or inductive elements (with the latter two types requiring no further maintenance). To make it easier for the photocells to receive light, it can be recommended to use high power discharge lamps to provide sufficient illumination in the sorting room. Similarly, the reception of waves transmitted by inductive elements can be improved by installing the system for transmitting such waves in the ceiling of the sorting room.

The indicator means 40 are remotely actuated from the optical reader terminal 5 which also performs this function via contactless transmission means, e.g. constituted by optoelectronic link means, e.g. operating in the infrared, or indeed by radio link means.

Preferably, a particular pigeonhole is provided to receive all articles of mail that have not been identified optically. This pigeonhole is advantageously a simple IN-tray 6 that can also be provided with indicator means 6A (and thus also with a unique identity number) and can be placed, for example, on a workbench 7 that carries the optical reader terminal 5. Thus, once automatic sorting has been terminated, the operator can go back to articles of mail in this tray (essentially mail with no specified destination or with handwriting that it has not been possible to decode) and can then perform sorting manually by placing these articles of mail one by one in the various appropriate pigeonholes, possibly after opening the articles of mail, and in any event without help from the assistance apparatus.

Also, in an advantageous variant embodiment, the terminal 5 is further provided with an optical reader and recognition device 8 for documents in A4 format (the device being of the flat-bed scanner type) to scan all or part of the cover page of a document included in an article of mail that was not recognized initially, thereby making it possible, after analyzing the contents of the article, to determine a destination for it. Such analysis (using an expert system and a database) can rely on the name or logo of the sender and also on key words in the document such as: complaint, order, check, invoice, etc. making it possible when no particular person can be recognized as the destination at least to identify a destination service. The reader and recognition device preferably includes software recognition means common to the means for recognizing the articles of mail 50. It can be advantageous to observe that this embodiment also has the advantage of enabling the envelopes of internal mail to be sorted directly (perforated envelopes of essentially A4 format and having name boxes). Similarly, in a second advantageous variant of the invention, the terminal 5 also has voice recognition means enabling the operator, via a microphone 9, to read out loud from an envelope or document the destination of the article of mail or any other information making it possible to identify indirectly its destination and thus activate an indicator on the corresponding pigeonhole (e.g. 40A). These two variant embodiments of the invention are particularly advantageous for a person who is not the usual operator (for example a stand-in, a temp, or a trainee), i.e. someone who has not yet accurately memorized the locations of the various pigeonholes. The various elements constituting the terminal 5 are controlled and monitored from a keypad 10 and a display screen 11 incorporated in the terminal. Such control and monitoring can also be performed remotely therefrom by means of a PC type computer 12 connected to the terminal 5 and possibly also fitted with a printer (not shown). In a variant (not shown), the optical reader 8 for an A4 document can also be located independently of the terminal 5 and connected directly to the computer 12.

It will be observed that the apparatus for assisting manual sorting can also include a module 13 for opening articles of mail placed at the outlet from the optical reader terminal so as to select the articles of mail selectively as a function of information recognized by the optical reader terminal 5. For example, articles of mail carrying the mentions "confidential", "strictly personal", or addressed to specific people (e.g. the chairman, the director, the company secretary, etc.) causing said module not to be activated.

Figure 2A:
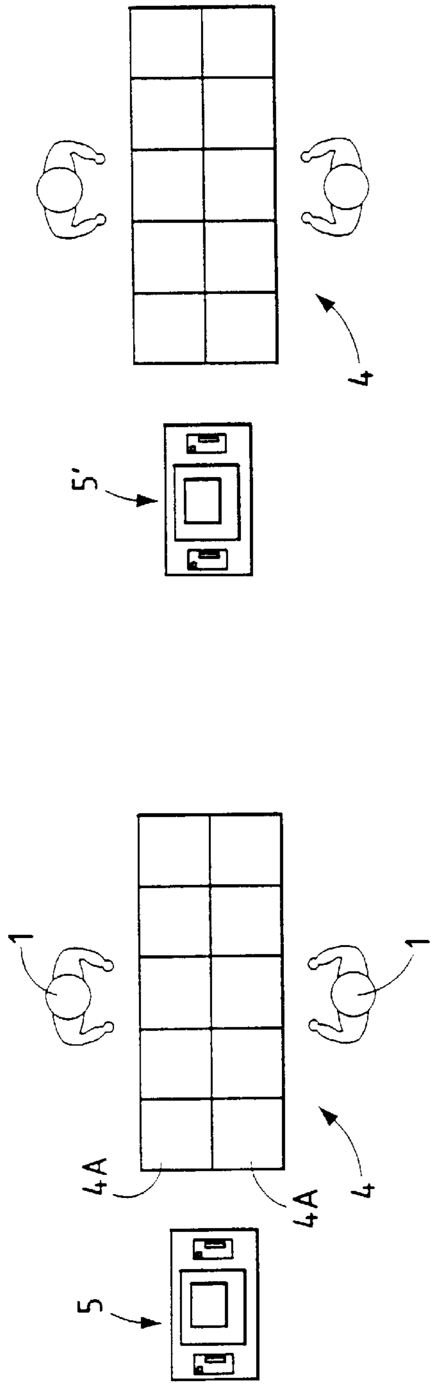
FIGS. 2A and 2B show two types of organization that can be envisaged for manually sorting mail.
Figure 2B:
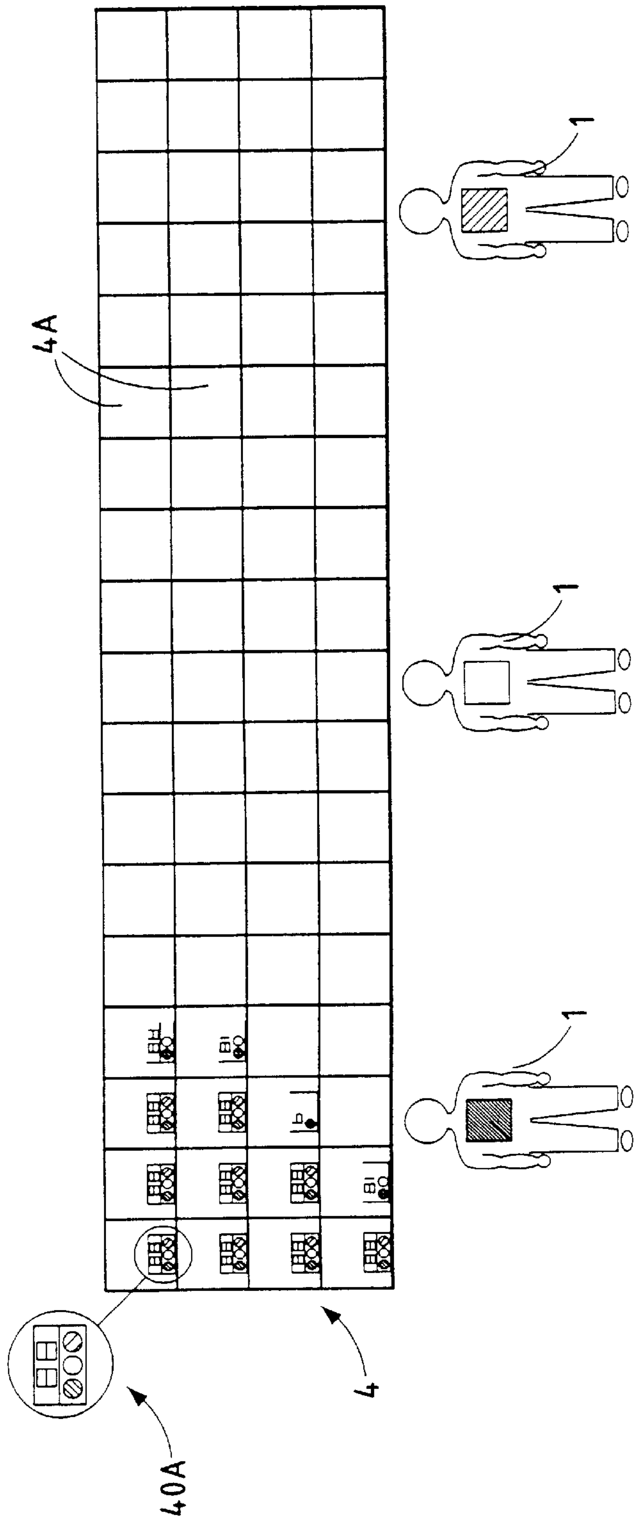

FIGS. 2A and 2B show two types of organization that can be envisaged for sorting mail by means of assistance apparatus of the invention in premises reserved for this purpose within a business. In FIG. 2A (a plan view), mail sorting is performed by four people 1 using two terminals 5 and 5', each person being in charge of handling 20 pigeonholes, for example (the pigeonholes occupying two storage frames 4, each having two faces). As before, each pigeonhole is provided with its own indicator which lights up when the terminal 5 or 5' delivers an article of mail that is to be placed in the corresponding pigeonhole (with lighting up causing the operator in charge of the pigeonhole to take action). In FIG. 2B (front view), the storage unit 4 has 18×4 pigeonholes and is served by three operators. Each pigeonhole has its own indicator made up of three lights of different colors (e.g. blue, yellow, red), each light corresponding to one of the three different operators. The indicator preferably also includes a liquid crystal panel for displaying two-digit numbers (00 to 99) thus making batch processing possible. The terminal 5 is organized to deliver articles of mail in successive batches of predetermined size (e.g. twenty articles). Thus, the terminal can proceed with reading and recognizing articles of mail one by one, and then once the batch has been processed it can cause one of the lights to light up (calling a particular operator), and on the panels it can display the output positions within the batch (e.g. from 1 for the top article to 20 for the bottom article), with withdrawal of the batch concerned from the terminal by the operator concerned leading to the next batch being processed for another operator. When a plurality of articles of mail in a given batch need to be placed in the same pigeonhole, provision can be made for the panel to display the various numbers in succession. Naturally, if the number of articles of mail making up a batch is small (in practice less than or equal to 10), then the display panels can be replaced by sets of LEDs.

The internal architecture of the optical reader terminal and of the pigeonhole display means are shown diagrammatically in FIGS. 3 and 4 respectively.

The terminal is organized around means 50 for reading and recognizing the destination of articles of mail. Recognition is performed on the basis of a prerecorded database in a memory 52 of the terminal with the information recognized on an article of mail (e.g. destination, service, department, office, sender, serial number, etc.) being compared therewith by the processor means 54. Means 56 for issuing an identity code for the pigeonhole corresponding to the identified destination are also provided for remotely causing the indicator means of the selected pigeonhole to display. Means 58 for opening articles of mail may optionally be available at the outlet from the terminal, which means are controlled in such a manner as to be inhibited whenever the identity code of the corresponding article of mail corresponds to one of the predetermined destinations for whom such opening is not authorized. When the apparatus of the invention is organized around a personal computer, it is the personal computer which has memory data and processor means appropriate for determining the destination. In conventional manner, this can be constituted by the address book file of the business, listing all personnel and services thereof. Under such circumstances, it is possible to manage an additional file of people who have left the business so as to send their mail to the corresponding person who has replaced them. It is also possible to manage mail that has been returned to sender and envelopes of the kind having name boxes for crossing out. Together these files make it possible to draw up various statistics for internal management purposes within the business.

The indicator means 40 include means 42 for receiving the pigeonhole identity code as emitted from the terminal 5, with the nature thereof naturally depending on the type of transmission used (optical, e.g. infrared, or radio), means 44 for comparing the received code with a specific internal code 45 stored in the indicator means, and visual or audible display means 46 for displaying the result of the comparison. It can be observed that the pigeonhole identity code can be present in the indicator means in a memory or can be available in hard-wired form. More simply, in order to enable frequent changes of configuration, the code can also be delivered by a code wheel. Finally, power supply means 48 provide self-contained power supply to all of the circuits of the indicator means.

FIG. 5 shows a simplified example of how the data memory 52 can be organized. This memory contains the various names of people who might receive mail in the business. Each of the names is associated with the title of a service or department to which that person belongs, a pigeonhole identity number or code, and optionally specific mentions stating whether the corresponding mail is confidential or personal in which case it cannot be opened (confid.) or whether the person in question is responsible in a given service for receiving mail that does not specify any particular person by name. When recognition also relates to data other than the destination proper (personal name or service), the memory 52 also includes a zone associated with each service, which zone contains one or more items of data suitable for being recognized as relating to the service. This can apply to the name of the sender such as ADECCO or MANPOWER (two temporary employment agencies) which may be associated with the personnel service, a particular supplier logo which can be associated with a purchasing service, a particular postage meter serial number that corresponds to a specified business communicating regularly with the drawing office, a particular type of foreign stamp which may be associated with the export department.

Naturally, the contents of the memory must be capable of being modified by the operator to add or remove new destinations for mail, to add to identifiable data, or indeed to modify the destinations allocated to the pigeonholes. The terminal 5 or the computer 12 is advantageously provided with a user friendly man/machine type interface from which the configuration of the sorting room can be defined and modified in simple manner (number of operators, number of pigeonholes, number of articles per batch, etc.) and from which modifications can be made to the memory as described above.

Figure 6:
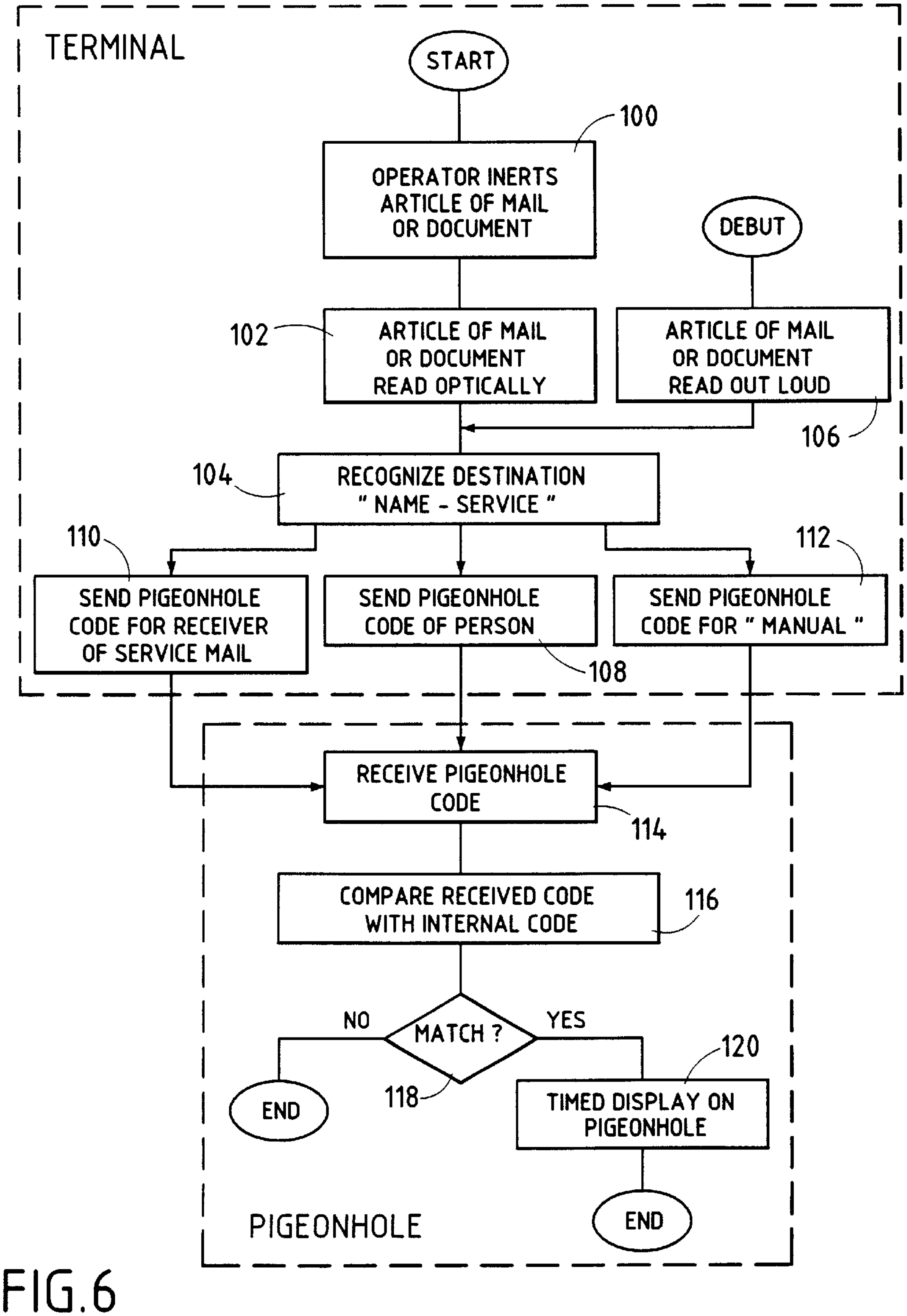
FIG. 6 is a flow chart explaining the operation of the apparatus of the invention.

The operation of the apparatus of the invention is described below with reference to FIG. 6. Initially, in a first step 100, the operator inserts a first article of mail into the terminal (it is also possible to put a stack of articles of mail into the input of the terminal). The article is then taken to the optical reader means of the terminal (conventionally a camera fitted with a CCD sensor, for example) which, in a step 102, scans it. In a following step 104, the various characters carried by the various written zones of the article of mail, including the address zone, are recognized by comparing the scanned data with data in the memory so as to identify a destination name, service, or department either directly or indirectly. It may be observed at this point that such character recognition can also occur after pertinent data on the article of mail has been read out loud (step 106). The three steps 100, 102, and 106 can naturally be applied in the same manner to the document itself which can be read optically (by the device 8) or which can be read out loud. Depending on the result of the identification, either the identity of the pigeonhole of a recognized destination is transmitted (step 108), or else, when the name of a particular person is not specifically mentioned (step 110), the identity code of the person responsible within a service or a department for receiving mail is transmitted, or else finally the identity code of the pigeonhole corresponding to manual sorting is transmitted when it has not been possible to find a person to whom to send the article of mail (step 112). The identity code is transmitted to the attention of all of the pigeonholes which receive it simultaneously in a step 114. In a following step 116, each pigeonhole indicator means compares said code with its own internal identity code. If the comparison is positive (corresponding to "yes" in the test of step 118), the indicator means in question activates its own display means in a final step 120, the indicator means of the other pigeonholes naturally remaining inactive. The display can remain in operation for a predetermined duration (e.g. the time required for a capacitor to discharge), or it can depend on the sorting throughput.

Naturally, the present invention is not limited to the particular embodiment described above. In particular, in small enterprises, it is possible to replace the storage frame with a plurality of storage trays (e.g. a dozen) disposed side by side in front of the operator on a workbench. It will be observed that the present invention is very easily adapted to various existing sorting methods, optionally including presorting of mail, and optionally associated with one or more storage frames. In this way, the presorting of confidential mail which is presently usually performed manually to avoid any undesired opening can be eliminated by the present invention and integrated with ordinary sorting. For example, recognizing the mention "confidential" or "strictly personal" will inhibit operation of the means for opening articles of mail.

What is claimed is:

1. Apparatus for providing assistance in manual sorting of articles of mail performed by an operator having available disposition storage elements corresponding to determined destinations, the articles of mail each including at least one document, and the apparatus comprising:

recognition means for reading one of an article of mail and a document extracted from the article, and identifying thereon at least one data item suitable for giving information about the destination of the article;

comparator means for comparing said identified data item with a plurality of previously stored predetermined data items;

allocation means for allocating a unique identity code to the recognized data item corresponding to a determined storage element allocated to a particular destination; and contactless transmission means for transmitting said identity codes to all of the storage elements;

each of said storage elements being provided with indicator means responding selectively to said identity code, said indicator means being retrofittably attachable by fixing means to said storage elements, respectively, to allow said apparatus to be used on existing storage elements.

2. Apparatus for providing assistance in manual sorting according to claim 1, wherein said identifiable data item is at least one of the following data items: the identity number of the addressee of the article of mail, the name of the addressee of the article, the service or the department of the business to which said article of mail is addressed, the destination post code of an article of mail, the territorial zone or the kind of addressee, the name of the sender, the serial number of the postage meter that franked the article of mail, and the particular configuration of the article of mail.

3. Apparatus for providing assistance in manual sorting according to claim 1, wherein the recognition means enable mail that has been returned to sender to be handled, and also enables mail having crossed-out name boxes to be handled.

4. Apparatus for providing assistance in manual sorting according to claim 1, wherein said recognition means include hardware scanning means for optically reading articles of mail of different formats.

5. Apparatus for providing assistance in manual sorting according to claim 4, wherein said hardware scanning means are organized so that optically reading can be performed on either face of the article of mail.

6. Apparatus for providing assistance in manual sorting according to claim 4, wherein optically reading is performed on formats of at least one of C4, C5, C6, and C6/5.

7. Apparatus for providing assistance in manual sorting according to claim 4, wherein said recognition means include optical character recognition software means.

8. Apparatus for providing assistance in manual sorting according to claim 4, wherein said recognition means include software means for recognition handwriting.

9. Apparatus for providing assistance in manual sorting according to claim 4, wherein said recognition means include hardware scanning means enabling documents in A4 format extracted from articles of mail to be read.

10. Apparatus for providing assistance in manual sorting according to claim 7, wherein said hardware scanning means enabling A4 format to be read are constituted by a flat bed scanner.

11. Apparatus for providing assistance in manual sorting according to claim 7, wherein the data identifiable by the A4 format hardware scanning means further comprise key words.

12. Apparatus for providing assistance in manual sorting according to claim 1, wherein the said contactless transmission means include optoelectronic link means.

13. Apparatus for providing assistance in manual sorting according to claim 1, wherein said contactless transmission means comprise radio link means.

14. Apparatus for providing assistance in manual sorting according to claim 1, wherein said indicator means comprise one of visual and audible indicator means having their own power supplies.

15. Apparatus for providing assistance in manual sorting according to claim 14, wherein said visual indicator means comprise at least one light indicator.

16. Apparatus for providing assistance in manual sorting according to claim 14, wherein said visual indicator means comprise a display panel for displaying a number for batch processing of articles of mail.

17. Apparatus for providing assistance in manual sorting according to claim 16, wherein said display panel is organized so that it is capable of displaying a plurality of numbers in succession, each corresponding to a determined position of an article of mail in the batch being processed.

18. Apparatus for providing assistance in manual sorting according to claim 14, wherein the power supplies of said indicator means are provided by photocells.

19. Apparatus for providing assistance in manual sorting according to claim 14, wherein the power supplies of said indicator means are provided via inductive elements.

20. Apparatus for providing assistance in manual sorting according to claim 14, wherein the power supplies of said indicator means are provided by long operating lifetime batteries.

21. Apparatus for providing assistance in manual sorting according to claim 1, wherein said removable fixing means comprise one of clamp and clip type elements.

22. Apparatus for providing assistance in manual sorting according to claim 1, wherein said removable fixing means comprise self-adhesive portions that can be removed several times.

23. Apparatus for providing assistance in manual sorting according to claim 1, the apparatus further including voice recognition means enabling articles of mail or documents that have not been identified by the optoelectronic recognition means to be identified.

24. Apparatus for providing assistance in manual sorting according to claim 1, wherein all of the articles of mail or the documents that are not identified by the optoelectronic recognition means are given the same identity code corresponding to the same storage element.

25. Apparatus for providing assistance in manual sorting according to claim 1, further comprising opening means for opening articles of mail, which means are disposed at the output of the recognition means, wherein said opening means are inhibited when the identity code of the corresponding article of mail is a code allocated to a predetermined addressee for whom such opening is not authorized.

26. Apparatus for providing assistance in manual sorting according to claim 2, wherein said recognition means include means for voice reading said identifiable data items.

* * * * *